(12) United States Patent
Yow et al.

(10) Patent No.: US 8,078,353 B2
(45) Date of Patent: Dec. 13, 2011

(54) SELF MONITORING BRAKING SYSTEM FOR VEHICLES

(75) Inventors: Kai Yun Yow, Petaling Jaya (MY); Poh Leng Eu, Petaling Jaya (MY)

(73) Assignee: Freescale Semiconductor, Inc., Austin, TX (US)

( * ) Notice: Subject to any disclaimer, the term of this patent is extended or adjusted under 35 U.S.C. 154(b) by 336 days.

(21) Appl. No.: 12/557,547

(22) Filed: Sep. 11, 2009

(65) Prior Publication Data

US 2011/0066347 A1   Mar. 17, 2011

(51) Int. Cl.
*G01M 17/00* (2006.01)
*G06F 19/00* (2006.01)

(52) U.S. Cl. ............ 701/29; 701/70; 701/71; 340/453; 340/454; 340/479; 307/10.8; 188/1.11 W; 188/1.11 L; 188/1.11 E

(58) Field of Classification Search .............. 701/29, 701/70, 71; 340/453, 454, 479; 73/121; 307/10.8, 10.1; 188/1.11 W, 1.11 L, 1.11 E
See application file for complete search history.

(56) References Cited

U.S. PATENT DOCUMENTS

| | | | |
|---|---|---|---|
| 5,339,069 A | 8/1994 | Penner et al. | |
| 5,825,287 A * | 10/1998 | Zarybnicky et al. | 340/453 |
| 5,848,672 A * | 12/1998 | Brearley et al. | 188/1.11 L |
| 5,892,437 A | 4/1999 | Scheibe et al. | |
| 5,920,128 A * | 7/1999 | Hines | 307/10.8 |
| 6,754,568 B1 * | 6/2004 | Ripley | 701/29 |
| 6,891,468 B2 * | 5/2005 | Koenigsberg et al. | 340/453 |
| 7,114,596 B2 * | 10/2006 | Borugian | 188/1.11 E |
| 7,847,679 B2 * | 12/2010 | Copeland et al. | 340/454 |
| 2004/0164612 A1 | 8/2004 | Worrel | |

* cited by examiner

*Primary Examiner* — Ronnie Mancho
(74) *Attorney, Agent, or Firm* — Charles Bergere

(57) ABSTRACT

A self monitoring vehicle braking system includes multiple sensors that gather data associated with the braking system. The data includes wheel speed, road inclination, moisture associated with a surface of the braking system, and audio associated with the road. A processor receives the data from the sensors and processes the data to determine whether a condition of the braking system falls within defined limits and provides to the driver of the vehicle an indication of the braking system condition.

20 Claims, 2 Drawing Sheets

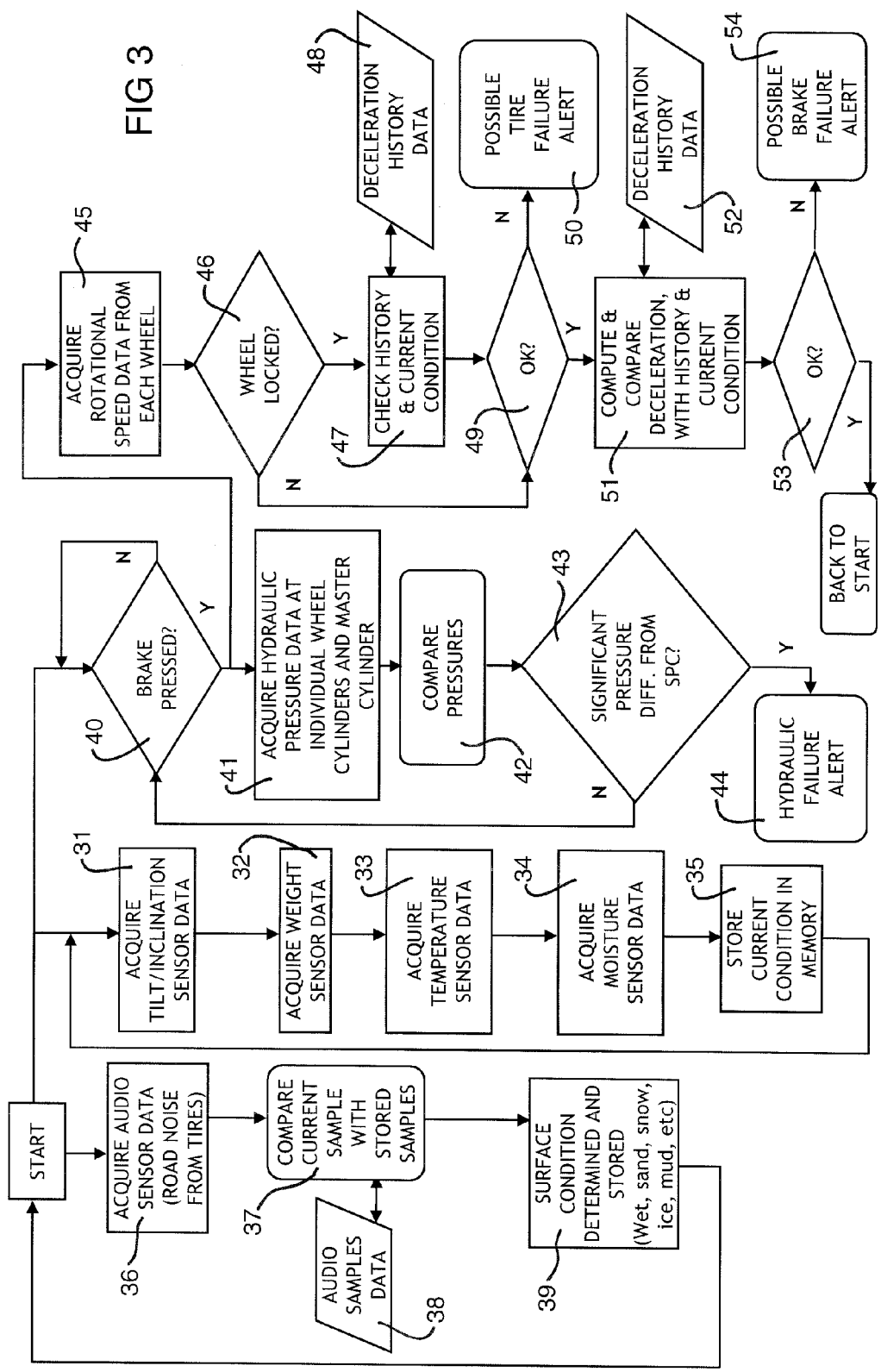

SELF MONITORING BRAKING SYSTEM FOR VEHICLES

BACKGROUND OF THE INVENTION

The present invention relates to a braking system suitable for vehicles. In particular the present invention relates to a braking system that monitors a variety of parameters that affect performance of the braking system including under different road environments. The braking system provides a driver of a vehicle an indication of a condition of the braking system in real time.

Reliable performance of a braking system depends on its condition being regularly maintained. Because a braking system invariably deteriorates with time including during use and due to other factors, drivers often may not know the condition of the braking system in their vehicle at any given point in time. This can endanger the safety of the driver and/or other road users.

Prior art methods for managing the problem include conducting periodic checks of the condition of the braking system, including the condition of braking surfaces and linings, tires, hydraulic brake fluid, etc. However, a problem with periodic checks is that not all drivers possess the time and/or discipline to maintain the system on a regular basis. Moreover not all components of a braking system deteriorate or wear uniformly or are replaced/serviced during a check up. Therefore, periodic maintenance may not be sufficient to detect faults or deficiencies in a braking system.

It is an object of the present invention to at least alleviate the disadvantages of the prior art.

BRIEF DESCRIPTION OF THE DRAWINGS

A preferred embodiment of the present invention will now be described with reference to the accompanying drawings wherein:

FIG. 3 is a flow chart of an algorithm associated with the control system shown in FIG. 2.

DETAILED DESCRIPTION OF THE INVENTION

Figure 2:
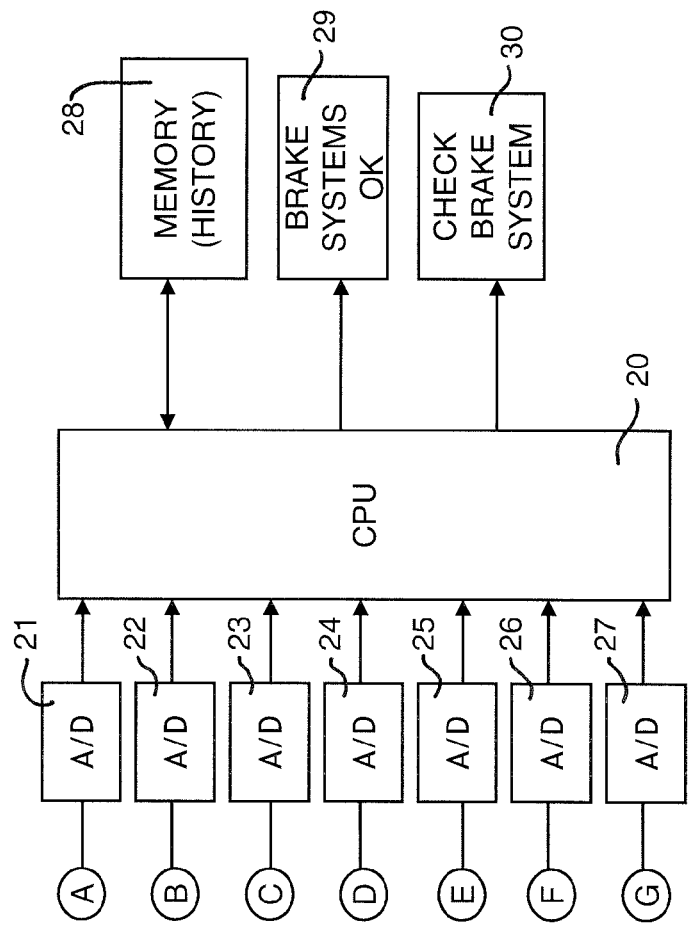
FIG. 2 is a block diagram of a control system associated with the braking system shown in FIG. 1.

According to one aspect of the present invention there is provided a self monitoring braking system suitable for a vehicle on a roadway. The braking system includes a plurality of sensors for monitoring data associated with the system. The data includes wheel speed, inclination of the road, moisture associated with a surface of said braking system, and audio associated with the road. A processor receives the data from the sensors and processes the data to determine whether a condition of the braking system falls within defined limits, and for providing a driver of the vehicle an indication of the condition of the braking system.

According to a further aspect of the present invention, a method of monitoring a braking system suitable for a vehicle on a roadway is provided. The method includes monitoring data associated with the braking system. The data includes rotation speed of a wheel associated with said vehicle, inclination of said roadway, moisture associated with a surface of said braking system, and audio associated with said roadway. A processor is used to determine whether a condition of said braking system falls within defined limits and to provide to a driver of said vehicle an indication of said condition.

The processor may include a central processing unit (CPU) and a software implemented algorithm. The algorithm may include statistical process control (SPC) for determining whether the condition of the braking system falls within the defined limits. In one embodiment, the SPC control calculates a sample mean and a sample standard deviation for the data. The SPC control sets an upper control limit based on the sample mean plus one or more standard deviations relative to the sample mean. The SPC control sets upper and lower control limits based on the sample mean plus or minus one or more standard deviations above or below the sample mean. For example if a sample mean brake fluid pressure is 200 psi, and the standard deviation is ±20 psi, the upper and lower control limits may be set at 220 psi and 180 psi respectively.

The sensors may be implemented in any suitable manner and by any suitable means. Examples of wheel speed sensors include sensors based on magnetic, inductive or optical sensor technologies. Examples of roadway inclination sensors include sensors based on rotary, tilt switch, electrolytic or accelerometer technologies. Examples of moisture sensors include sensors based on capacitive polymer, microwave, or ceramic impedance technologies. Examples of audio sensors include sound sensors based on crystal, magnetic or capacitive technologies.

In one embodiment, the braking system includes one or more analog to digital converters for interfacing the sensors to the central processing unit (CPU). The braking system also includes a memory for storing data associated with the system. The system includes a training mode for acquiring primary or training data from the sensors. The system may be adapted to store the primary or training data in the memory at least temporarily or as a history archive for future reference. The system generates secondary data from the acquired primary or training data. The secondary data may include deceleration data from speed sensors associated with the wheels of the vehicle. The speed of each wheel may be monitored independently. The secondary data may be stored in the memory or history archive in association with the primary or training data for future reference.

The system also may include a running mode for acquiring running data from the sensors at least when the driver operates the braking system. The CPU may store the running data in the memory together with the secondary data. The running data acquired during the running mode may be compared with the primary or training data stored in the memory or history archive. If the running mode data falls within upper/lower limits of SPC control the system may treat the condition as acceptable or normal. If the running mode data falls outside of the upper/lower limits of SPC control the system may treat the condition as unacceptable or abnormal and may provide an indication to the driver in any suitable manner or via any suitable means. The braking system may include means for indicating a condition of the braking system to the driver of the vehicle. The condition may include a percentage deterioration relative to a predetermined reference. The means for indicating may include a visual indication on the dashboard and/or an audible indication such as an alarm.

The system can provide an indication of the condition of the braking system on a continuous or a semi-continuous basis. The indication may include a numerical measure of deterioration of the secondary data relative to the predetermined reference. The reference may include an aggregate value determined from the sample mean for each parameter and/or the upper and lower control limits. The indication may include a warning or alert in wet conditions when the braking system may be vulnerable to performance deterioration due to moisture affecting friction between braking surfaces including between brake pads/discs and tires/road surfaces.

The monitored data may include pressure of brake fluid. The pressure of brake fluid may include ingoing pressure to each brake cylinder. The pressure of brake fluid may include outgoing pressure from each master cylinder. The monitored data may include weight of the vehicle, and temperature of a brake pads assembly associated with each wheel of the vehicle.

Figure 1:
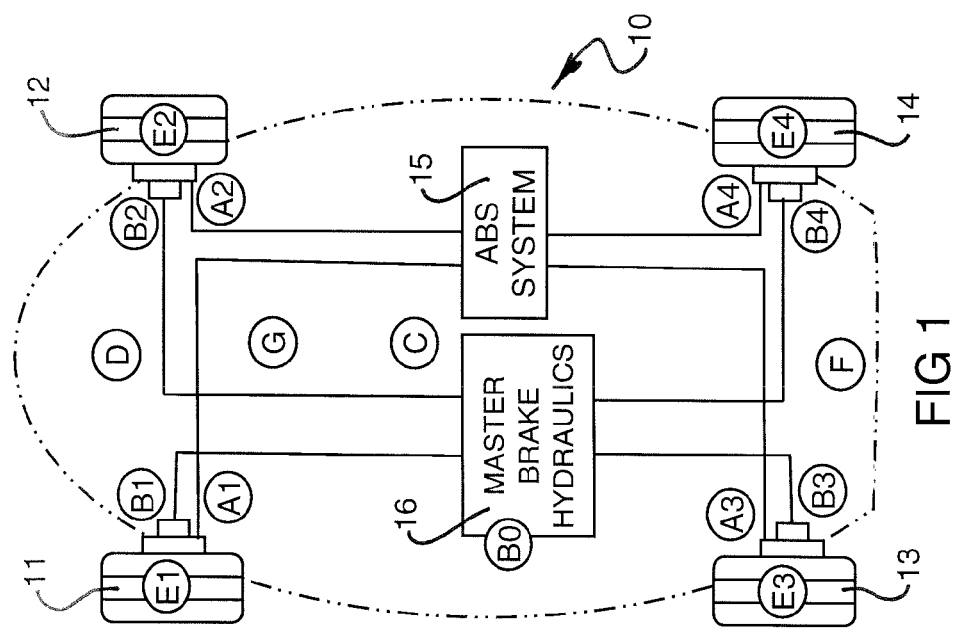
FIG. 1 shows a braking system fitted to a vehicle according to an embodiment of the present invention.

Referring now to FIG. 1, a vehicle 10 fitted with a self monitoring braking system according to the present invention is shown. The braking system includes rotational speed sensors A1 to A4 associated with wheels 11 to 14 respectively of vehicle 10. In one embodiment each speed sensor A1 to A4 includes a proximity sensor that can sense teeth on an associated brake disc. As the brake disc rotates the proximity sensor may provide a series of electrical pulses. The frequency of the pulses may increase with increasing rotational speed of the associated wheel. Speed sensors A1 to A4 may be shared with an associated system such as an ABS system 15 (anti-skid braking system).

The braking system includes a pressure sensor B0 for sensing brake fluid pressure outgoing from one or more master cylinders associated with master brake hydraulics 16. The braking system includes wheel pressure sensors B1 to B4 for sensing brake fluid pressure ingoing to slave or wheel cylinders associated with wheels 11 to 14 respectively.

The braking system includes an inclination or tilt sensor C for sensing gradient or grade severity of the roadway on which vehicle 10 is travelling, e.g., uphill, downhill or along a flat road. Inclination sensor C may be implemented by means of one or more accelerometers and a suitable algorithm. Inclination sensors are commercially available, such as from Freescale Semiconductor, Inc. of Austin, Tex.

The braking system includes a mass sensor D for sensing a current weight or mass of vehicle 10. Mass of vehicle 10 including its occupants is a factor that affects deceleration when a specified level of braking effort or force is applied. Mass sensor D may include an electronic transducer for converting a load or force into an electrical signal. The transducer may include a load cell or strain gauge. In one form a Wheatstone Bridge circuit may be used for measuring a change in resistance of a strain gauge to provide an electrical signal indicative of a load or mass.

The braking system includes temperature sensors E1 to E4 associated with wheels 11 to 14 respectively of vehicle 10. Temperature sensors E1 to E4 are positioned to sense temperature of brake pads assemblies associated with wheels 11 to 14 respectively.

The braking system includes moisture sensor F for sensing moisture associated with a surface of the braking system such as a brake disc surface. Moisture sensor F may include a moisture probe model MA-800 manufactured by Callidan Instruments Pty Ltd and marketed under the trade mark MOISTSCAN®.

The braking system includes audio sensor G for sensing sound associated with the roadway including rotational contact of tires on the surface of the roadway on which vehicle 10 is travelling. The surface sound will vary according to surface condition eg. wet, dry, snow, dirt, ice etc. The condition of the surface of the roadway is a factor that affects deceleration when a specified level of braking effort or force is applied.

Audio sensor G may include an outdoor microphone model such as a type 4952 or 4952-A manufactured by Brüel & Kjaer. The audio sensor G may receive surface sound waveforms from the road. The sound waveforms may be sampled and stored in a database of sound waveforms in memory 28. The database may be assembled during a training mode during which various waveforms may be associated with known road surface types.

During a running mode the database may be interrogated for a close match (preferably 80-90%) to a stored waveform from which the corresponding road surface type may be deduced. Waveform recognition may be performed in any suitable manner or by any suitable means. In one form waveform recognition may be performed by a digital signal processor such as DSP56000 family available from Freescale Semiconductor, Inc. of Austin, Tex. If no match is encountered, unrecognized audio samples may be stored in a designated memory (such as an SD card or USB storage device) for uploading to the manufacturer to enable firmware updates to be provided to the database periodically.

Referring to FIG. 2, the braking system includes a central processing unit (CPU) module 20 for monitoring and processing output data from sensors A to G. Output data that is analog is converted to a digital format via associated analog to digital converters 21 to 27.

The braking system includes a memory module 28 for storing a history of data values at least during a training mode and for storing instructions including the software implemented algorithm and/or other data.

The braking system includes a display module 29 for displaying a condition of the braking system on a continuously or discontinuously updated basis. The display module 29 may include a digital indicator on a dashboard of vehicle 10 or the like. The display module 29 may display a percentage deterioration of the braking system relative to a reference such as a predetermined sample or weighted mean.

The braking system includes a warning module 30 for providing a warning to the driver when the braking system has exceeded predetermined operating limits that may impact on the safety of the vehicle and/or its occupants. The exceeded limits may include multiple factors including exceeded upper or lower limits of SPC control, vulnerability to moisture or other road conditions, etc.

Referring to FIGS. 2 and 3, data is acquired in a running mode from tilt/inclination sensor C (step 31), mass sensor D (step 32), temperature sensors E1 to E4 (step 33) and moisture sensor F (step 34) substantially on a continuous basis and is stored in memory 28 associated with CPU 20 (step 35).

At the same time CPU 20 acquires audio samples of road sound produced by rotational contact of the tires on the roadway (step 36). The audio samples are compared (step 37) with audio samples data (38) acquired during a training mode. From the comparison a surface condition of the roadway is determined e.g., wet, sand, snow, ice, mud, etc (step 39). Each time the braking system is operated (step 40) CPU 20 acquires hydraulic pressure data from individual wheel cylinders and the master cylinder associated with master brake hydraulics 16 (step 41). CPU 20 compares differences in hydraulic pressure at each wheel (step 42) and if this falls outside of an allowable range (step 43) it is interpreted as a hydraulic fault and an alert is sounded to the driver (step 44).

Each time the braking system is operated (step 40) CPU 20 also acquires data from speed sensors A1 to A4 associated with wheels 11 to 14 respectively (step 45). The speed data is processed to determine if there is wheel lock (step 46). If so CPU 20 checks deceleration history data (48) and compares this to current condition parameters to determine if locking of the wheels is likely to occur (step 47). If locking should not occur based on previous history (step 49) possible tire failure is alerted to the driver (step 50). If the speed data is processed to determine that the wheels do not lock (step 51) and an expected level of deceleration is not achieved based on deceleration history data 52 (step 53) an alert indicating possible deterioration in the braking system is signalled to the driver (step 54). The operation is repeated if no errors are detected.

Finally, it is to be understood that various alterations, modifications and/or additions may be introduced into the constructions and arrangements of parts previously described without departing from the spirit or ambit of the invention.

The invention claimed is:

1. A self monitoring braking system suitable for a vehicle on a roadway comprising:
a plurality of sensors for monitoring data associated with said braking system, said data including:
speed of a wheel associated with said vehicle;
inclination of said roadway;
moisture associated with a surface of said braking system; and
audio associated with said roadway; and
a processor that receives said data from said plurality of sensors and processes said data to determine whether a condition of said braking system falls within defined limits and provides to a driver of said vehicle an indication of said condition of said braking system.

2. A braking system according to claim 1, wherein said processor includes a central processing unit (CPU) and a software implemented algorithm.

3. A braking system according to claim 2, wherein said algorithm includes statistical process control (SPC) for determining whether said condition of said braking system falls within said limits.

4. A braking system according to claim 3, further comprising means for calculating a sample mean and a sample standard deviation for said data.

5. A braking system according to claim 1, including a training mode for acquiring training data from said sensors.

6. A braking system according to claim 1, further comprising a running mode for acquiring running data from said sensors at least when the driver operates the braking system.

7. A braking system according to claim 1, further comprising means for indicating a condition of said braking system to the driver.

8. A braking system according to claim 7, wherein said condition includes a percentage deterioration relative to a predetermined reference.

9. A braking system according to claim 1, wherein said monitored data includes brake fluid pressure.

10. A braking system according to claim 9, wherein said brake fluid pressure includes ingoing pressure to a brake cylinder.

11. A braking system according to claim 9, wherein said brake fluid pressure includes outgoing pressure from a master cylinder.

12. A braking system according to claim 1, wherein said monitored data includes weight of said vehicle.

13. A braking system according to claim 1, wherein said monitored data includes temperature of a brake pads assembly associated with each wheel of said vehicle.

14. A self monitoring braking system suitable for a vehicle on a roadway comprising:
a plurality of sensors for monitoring data associated with said braking system, said data including:
speed of a wheel associated with said vehicle;
inclination of said roadway;
moisture associated with a surface of said braking system; and
audio associated with said roadway;
temperature of a brake pads assembly associated with each wheel of said vehicle;
brake fluid pressure
weight of said vehicle;
a processor that receives said data from said plurality of sensors and processes said data to determine whether a condition of said braking system falls within defined limits; and
means, connected to the processor, for indicating the condition of said braking system to the driver.

15. A method of monitoring a braking system suitable for a vehicle on a roadway, said method comprising:
monitoring data associated with said system, said data including speed of a wheel associated with said vehicle; inclination of said roadway; moisture associated with a surface of said braking system; temperature of a brake pads assembly associated with each wheel of said vehicle; vehicle weight; and audio associated with said roadway;
processing said data to determine whether a condition of said braking system falls within defined limits; and
providing to a driver of said vehicle an indication of said condition.

16. A method of monitoring a vehicle braking system according to claim 15, wherein said processing is performed via a central processing unit (CPU) and a software implemented algorithm, wherein said algorithm includes statistical process control (SPC) for determining whether said condition of said braking system falls within said limits.

17. A method of monitoring a vehicle braking system according to claim 16 including calculating a sample mean and a sample standard deviation for said data.

18. A method of monitoring a vehicle braking system according to claim 15, including a training mode for acquiring training data from at least one sensor, and a running mode for acquiring running data from at least one sensor at least when the driver operates the braking system.

19. A method of monitoring a vehicle braking system according to claim 15, wherein said condition includes a percentage deterioration relative to a predetermined reference.

20. A method of monitoring a vehicle braking system according to claim 15, wherein said monitored data includes brake fluid pressure, wherein said brake fluid pressure includes brake cylinder pressure and master cylinder pressure.

* * * * *